3,394,552
MICROORGANISM RESISTANT FORMULATION AND METHOD
William Herbert Montgomery, Springdale, and Jon Hugh Kentfield, South Norwalk, Conn., assignors to American Cyanamid Company, Stamford, Conn., a corporation of Maine
No Drawing. Filed May 10, 1965, Ser. No. 455,047
3 Claims. (Cl. 61—36)

ABSTRACT OF THE DISCLOSURE

In resin bonding of structures, particularly underground rock, with ambient temperature setting polyester resins, the usual catalyst mixtures support fungal growth. A mixture of an organic peroxide and Portland cement, optionally with a dust inhibiting quantity of a dialkyl phthalate, as a catalyst, gives a good cure, and a hardened resin composition that resists microorganisms under adverse conditions.

---

This invention relates to a catalyst formulation for the resin bonding of structures in which polyester resins are cured in place with the aid of a catalyt free from carbohydrates or other fungal growth supporting agents, and the method of using such resins embodying the catalyst.

The bonding of structures, particularly underground rock structures, or surface rock structures and cement structures is disclosed in U.S. Patents 3,091,935, Brown & Prichard, "Rock Treatment," June 4, 1963; 3,091,936, Lundberg, Schlegel & Carpenter, "Resinous Composition," June 4, 1963; and 3,163,010, J. E. Carpenter, "Mine Roof Stabilization Detection," December 29, 1964. Additionally, a copending application, Ser. No. 317,563, Daniel Chalmers McLean, filed Oct. 21, 1963, entitled "Rock Bolting," now 3,324,663, June 13, 1967, discloses at length the use of polyester resins in the bolting of underground structures, including mineral formations such as rock in mines, as well as other ground control applications. The use of resin formulations with reinforcing members of fiber glass to modify shock wave propagation is disclosed in copending application Ser. No. 407,205, filed Oct. 28, 1964, Daniel Chalmers McLean, entitled, "Reinforcing Bolts," including both rock and concrete structures so reinforced.

It has now been found that such formulations at times support fungus growth which has resulted in discoloration of the structure and is suspected of leading to weakening, lending towards incipient failure. The length of time required for such failure is, of course, speculative, but every effort must be made to prevent compromise of strength retention in engineering structures.

The rate of fungus growth involves such variables as time, temperature, moisture availability, lighting conditions, method and type of inoculation, as well as the mining resin composition.

Where fungal growth is a problem, it is quite customary to add a fungicide. In on-the-job tests the following commercially-available fungicides at the indicated levels were tested.

| Fungicide | Amount added by weight, percent |
|---|---|
| Phenyl mercuric acetate 30% | 0.1 |
| Dowicide® "G" | 0.1 |
| Dowicide® "G" | 0.5 |
| Cupric sulfate | 0.5 |
| Arsenosobenzene 10% | 0.3 |
| n-Dodecylguanidine acid phthalate | 0.1 |
| Dodecylguanidine | 0.1 |

None of these fungicides completely eliminated fungus growth although fungus growth was retarded. For instance, under mining conditions where an untreated resin showed mold growth in two months, the fungicides delayed a comparable degree of growth for from four to six months.

It has now been found that a major contribution towards fungus growth results from catalyst compositions which have been used in such resins. Catalysts for polyester resins include peroxides, such as benzoyl peroxide or cyclohexanone peroxide, hydroxy heptyl peroxide, 1-hydroxy cyclohexyl hydroperoxide-1, t-butyl hydroperoxide, 2,4-dichlorobenzoyl peroxide and the like. Methyl ethyl ketone peroxide or other ketone peroxides give good results, as do mixtures of their peroxides. The ketone peroxides are volatile and may be lost by evaporation.

Because of commercial availability and price, benzoyl peroxide is often the peroxide in commercial formulations.

Any of the peroxides in a concentrated form may show explosive tendencies. Hence, the commercially available catalysts usually contain peroxides blended with an inert material to reduce possible hazards of handling. It has been found that a catalyst consisting of commercially pure benzoyl peroxide mixed with Portland cement forms a catalyst which is non-explosive and, hence, may be handled without special precautions from the explosion standpoint and which is sufficiently diluted to be readily dispersed. The exact ratio of benzoyl peroxide to Portland cement is not critical but around 10% gives a good formulating ratio. The upper concentration is, of course, the acceptable explosivity limits. Even a small portion of Portland cement reduces the risks and a minor proportion also eases the problem of blending and dispersing the catalyst in the resin. If less than about 10% of benzoyl peroxide is used the volume becomes fairly bulky. Additionally, to eliminate dust and reduce the time required for mixing into the resin, an organic ester is added to the catalyst composition. Diesters of phthalic acid, such as dibutyl phthalate, give good results. Dibutyl phthalate is economical and readily available commercially and, hence, usually used, although any of the other liquid esters of phthalic acid, such as dihexyl phthalate, dioctyl phthalate or mixed phthalates give good results. A commercially preferred catalyst is one which contains approximately 5% to 10% of benzoyl peroxide, 75% to 95% Portland cement, and optionally up to 11% dibutyl phthalate. Concentrations are not critical but such a composition is readily prepared and is very effective.

Additionally, and unexpectedly, the storage stability of benzoyl peroxide is improved by the new formulation. Benzoyl peroxide has been blended with starch for use as a bleach for flour. It is found that the mixture with Portland cement keeps better and is more effective. In a catalyst system, either the gel time and the hardening time is shorter, or a smaller quantity of real benzoyl peroxide is used to accomplish the same gel and hardening rates. The dialkyl phthalate esters reduce dust problems, without having a deleterious effect on the catalyst composition or the polyester resin prepared therefrom.

Example 1

A polyester resin was prepared using the procedure of Example 1 of U.S. Patent 3,091,936, supra, from 1910 parts of maleic anhydride, 1480 parts phthalic anhydride, and 2540 parts propylene glycol. Carbon dioxide was used to protect the reaction mixture from the atmosphere while the ingredients were heated with stirring to 160° and esterification continued to an acid number of 38. The mixture was cooled to 80° C. and cut with methyl styrene in the proportion of 70 parts resin to 30 parts methyl styrene. As disclosed in U.S. Patent 3,091,936, supra, a large number of other formulations may be used. Said disclosure is hereby incorporated by reference rather than set forth in detail to avoid extending the length of this specification.

To 84.5 parts of this resin was added 0.006 part hydroquinone, 0.9 part of Emulphor EL-719, a proprietary hydrophilic non-ionic surfactant made by polyoxyethylating vegetable oil, 0.025 part diethyl aniline, 1.0 part of vinyl toluene, 9.4 parts water, and 4 parts of pyrogenic colloidal silica (Cab-o-sil)®.

Comparative tests were run using the above formulation as the resin paste in which 77% of resin paste was mixed with 23% of the above catalyst consisting of 9.4% benzoyl peroxide, 80.6% Portland cement and 10% dibutyl phthalate. For comparison a prior art resin was used in which the benzoyl peroxide was in part diluted with starch, as in conventional practice. In comparative tests, the gel time with the new catalyst was 13 minutes at room temperature of 70° F., slightly faster than the earlier formulations, and the strength was at least as good. On long-term standing the earlier resin was found to be attacked by fungi such as the fungus Botrytis. The new formulation in comparative tests underground in the dark, under moist conditions, and under other conditions observed, showed no evidence of attack by microorganisms over periods longer than six months. The prior art material showed fungus attack in adjacent test specimens. From laboratory tests under conditions most favorable to fungus growth, it is to be anticipated that the resin formulation will be free from fungus growth over its economical engineering life of at least twenty to forty years. Continuing tests towards proof of this are in progress but obviously have not been completed.

Tests using the formulated resin (1) alone to reinforce underground rock formations such as disclosed in U.S. Patents 3,091,935, 3,091,936 and 3,163,010, supra, (2) to reinforce rock formations or concrete in which the formulated resin is used with reinforced metallic reinforcing elements, and (3) to reinforce rock formations or concrete in which the formulated resin is used with fiber glass reinforcing elements all show the long life, stability and freedom from fungal growth desirable in such reinforcing operations.

We claim:

1. A method of reinforcing a mineral formation which comprises forming a comparatively long narrow hole and inserting therein a polyester resin comprising a peroxide catalyst consisting essentially of an organic peroxide and Portland cement and 0 to 10% by weight of the catalyst of a dialkyl phthalate, said polyester resin, when hardened, being essentially storage stable over a period of at least 6 months in the presence of microorganisms and moisture, even in the dark.

2. The method of claim 1 in which the mineral formation is reinforced by a solid metallic reinforcing member in said long narrow hole.

3. The method of claim 1 in which the mineral formation is reinforced by a fiber glass resin tension member in said long narrow hole.

References Cited
UNITED STATES PATENTS

| | | | |
|---|---|---|---|
| 3,332,244 | 7/1967 | McLean | 61—35 |
| 2,921,463 | 1/1960 | Goldfein | 52—309 X |
| 3,091,936 | 6/1963 | Lindberg et al. | 61—36 |
| 3,218,273 | 11/1965 | Montesano | 260—40 |
| 3,240,736 | 3/1966 | Beckwith | 260—40 |
| 3,283,513 | 11/1966 | Kierans et al. | |

JACOB SHAPIRO, *Primary Examiner.*